United States Patent
Seo et al.

(10) Patent No.: US 10,804,608 B2
(45) Date of Patent: Oct. 13, 2020

(54) ANTENNA AND ELECTRONIC DEVICE INCLUDING DIELECTRIC OVERLAPPED WITH AT LEAST PORTION OF THE ANTENNA

(71) Applicant: Samsung Electronics Co., Ltd., Suwon-si, Gyeonggi-do (KR)

(72) Inventors: Seunghan Seo, Suwon-si (KR); Seunggil Jeon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/573,359

(22) Filed: Sep. 17, 2019

(65) Prior Publication Data

US 2020/0144722 A1    May 7, 2020

(30) Foreign Application Priority Data

Nov. 6, 2018  (KR) .......................... 10-2018-0135271

(51) Int. Cl.
| | |
|---|---|
| *H04B 1/40* | (2015.01) |
| *H04M 1/02* | (2006.01) |
| *H01Q 9/04* | (2006.01) |
| *H01Q 1/24* | (2006.01) |
| *H01Q 23/00* | (2006.01) |

(52) U.S. Cl.
CPC ........... *H01Q 9/0407* (2013.01); *H01Q 1/243* (2013.01); *H04M 1/026* (2013.01); *H01Q 23/00* (2013.01)

(58) Field of Classification Search
CPC ... H04B 1/04; H04B 1/03; H04B 1/16; H04B 1/40; H04M 1/02; H04M 1/03; H04M 1/026; H01Q 9/0407; H01Q 1/243; H01Q 23/00
See application file for complete search history.

(56) References Cited

U.S. PATENT DOCUMENTS

| | | | | |
|---|---|---|---|---|
| 5,358,515 | A * | 10/1994 | Hurter ................. | A61B 18/18 607/101 |
| 6,563,463 | B1 * | 5/2003 | Saito .................... | G01V 15/00 343/700 MS |
| 2008/0062062 | A1 * | 3/2008 | Borau ................. | H01Q 21/065 343/844 |

(Continued)

FOREIGN PATENT DOCUMENTS

KR    10-2016-0018916 A    2/2016

*Primary Examiner* — Andrew Wendell
(74) *Attorney, Agent, or Firm* — Jefferson IP Law, LLP

(57) ABSTRACT

An electronic device is provided. The electronic device includes a housing that has a first plate facing a first direction, a second plate facing a second direction and opposite to the first plate, and a lateral member surrounding a space between the first plate and the second plate. The electronic device further includes an antenna structure disposed to be substantially parallel to the second plate in the space, and including at least one antenna element disposed to face the second plate. Also, the electronic device includes a dielectric disposed, in the space, to overlap, at least in part, with the antenna structure without exceeding a half area of the antenna structure when the second plate is viewed from above, and a wireless communication circuit configured to form a directional beam, at least in part, through the at least one antenna element.

20 Claims, 13 Drawing Sheets

(56) References Cited

U.S. PATENT DOCUMENTS

| | | | |
|---|---|---|---|
| 2008/0254836 A1* | 10/2008 | Qi | H01Q 1/38 |
| | | | 455/566 |
| 2012/0206303 A1* | 8/2012 | Desclos | H01Q 1/40 |
| | | | 343/702 |
| 2016/0028148 A1* | 1/2016 | Tan | H01Q 9/0407 |
| | | | 343/702 |
| 2017/0110787 A1 | 4/2017 | Ouyang et al. | |
| 2018/0191081 A1* | 7/2018 | Lukyanov | H01Q 13/26 |
| 2018/0233815 A1* | 8/2018 | Deng | H01Q 1/422 |
| 2019/0027809 A1* | 1/2019 | Judkins | H04B 1/18 |
| 2019/0103656 A1* | 4/2019 | Shi | G06F 1/1698 |

* cited by examiner

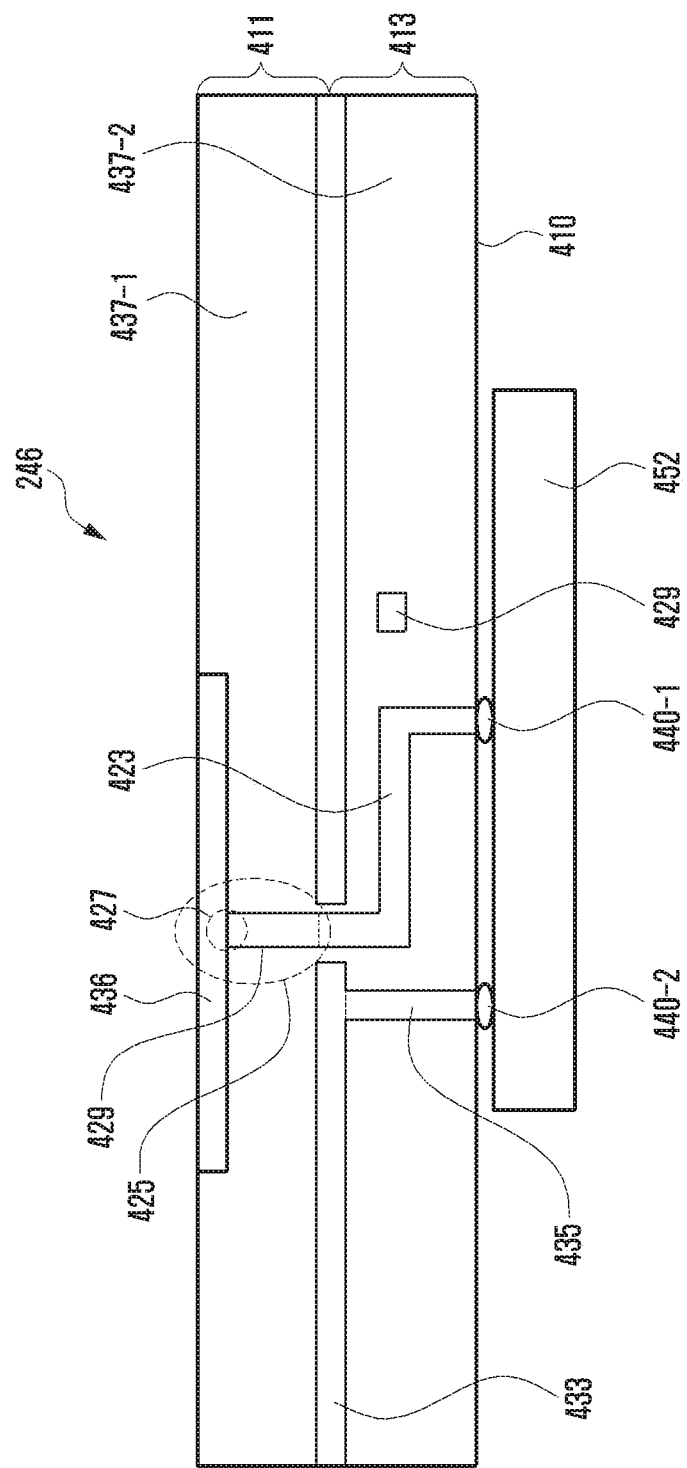

ANTENNA AND ELECTRONIC DEVICE INCLUDING DIELECTRIC OVERLAPPED WITH AT LEAST PORTION OF THE ANTENNA

CROSS-REFERENCE TO RELATED APPLICATION(S)

This application is based on and claims priority under 35 U.S.C. 119(a) of a Korean patent application number 10-2018-0135271, filed on Nov. 6, 2018, in the Korean Intellectual Property Office, the disclosures of which is incorporated by reference herein in its entirety.

BACKGROUND

1. Field

The disclosure relates to an antenna and an electronic device. More particularly, the disclosure relates to a dielectric overlapping with at least a portion of the antenna.

2. Description of Related Art

With the growth of wireless communication technology, a great variety of electronic devices (e.g., electronic devices for communication) are being widely used over the world. In addition, the use of multimedia contents over a communication network is increasing exponentially, so that the network capacity is gradually reaching the limit After the commercialization of a 4th generation (4G) communication system, a next-generation communication system (e.g., a 5th generation (5G) communication system, a pre-5G communication system, or a new radio (NR) communication system) using a super-high frequency (e.g. millimeter wave (mmWave)) band (e.g., 3 GHz to 300 GHz band) is now studied in order to satisfy the increasing demands of radio data traffic.

Next-generation wireless communication technologies are currently developed to permit signal transmission/reception using frequencies in the range of 3 GHz to 100 GHz, overcome a high free space loss due to frequency characteristics, implement an efficient mounting structure for increasing an antenna gain, and realize a related new antenna structure. This antenna structure may include an array-type antenna module in which various numbers of antenna elements are arranged at regular intervals. The antenna module may form a beam pattern on a planar printed circuit board through a cover plate (e.g., a rear plate) provided as a part of a housing for protecting internal electronic components of the electronic device and forming the appearance of the device. The cover plate may be formed of coated or colored glass, ceramic, polymer, metal, or any combination thereof Between the antenna module and an external space of the electronic device, not only the cover plate but also internal structures of the electronic device such as a double-sided tape member, a bracket, and a waterproof member may be interposed.

The beam pattern of the antenna module is formed through the cover plate and/or the internal structures each of which has a specific dielectric constant. This may cause a problem of degrading the radiation performance of the antenna module. For example, the beam pattern of the antenna module should have a half power beam width (HPBW) being wide in the increasing direction of the antenna elements and also have the HPBW being narrow in the direction orthogonal to the increasing direction of the antenna elements. In this case, side lobes may be generated on sides of the boresight direction on the HPBW plane, and the characteristics of the side lobes may cause a problem of radio wave crosstalk of the antenna module.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an antenna and an electronic device including a dielectric disposed to be overlapped, at least in part, with the antenna.

Various embodiments of the disclosure provide an antenna configured to prevent degradation of radiation performance of an antenna module caused by various internal structures which are disposed inside an electronic device and have specific dielectric constants, and also provide the electronic device including a dielectric which is disposed to be at least partially overlapped with the antenna.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first plate facing a first direction, a second plate facing a second direction and opposite to the first plate, and a lateral member surrounding a space between the first plate and the second plate, an antenna structure disposed to be substantially parallel to the second plate in the space, and including at least one antenna element disposed to face the second plate, a dielectric disposed in the space to overlap, at least in part, with the antenna structure without exceeding a half area of the antenna structure when the second plate is viewed from above, and a wireless communication circuit configured to form a directional beam, at least in part, through the at least one antenna element.

In accordance with an aspect of the disclosure, an electronic device is provided. The electronic device includes a housing including a first plate facing a first direction, a second plate facing a second direction and opposite to the first plate, and a lateral member surrounding a space between the first plate and the second plate, an antenna structure disposed to be substantially parallel to the second plate in the space, and including a plurality of antenna elements disposed to face the second plate, a dielectric disposed through the second plate to overlap, at least in part, with the plurality of antenna elements without exceeding a half area of the plurality of antenna elements when the second plate is viewed from above, and a wireless communication circuit configured to form a directional beam, at least in part, through the plurality of antenna elements.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4B is a cross-sectional view taken along the line Y-Y' in FIG. 4A according to an embodiment of the disclosure.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
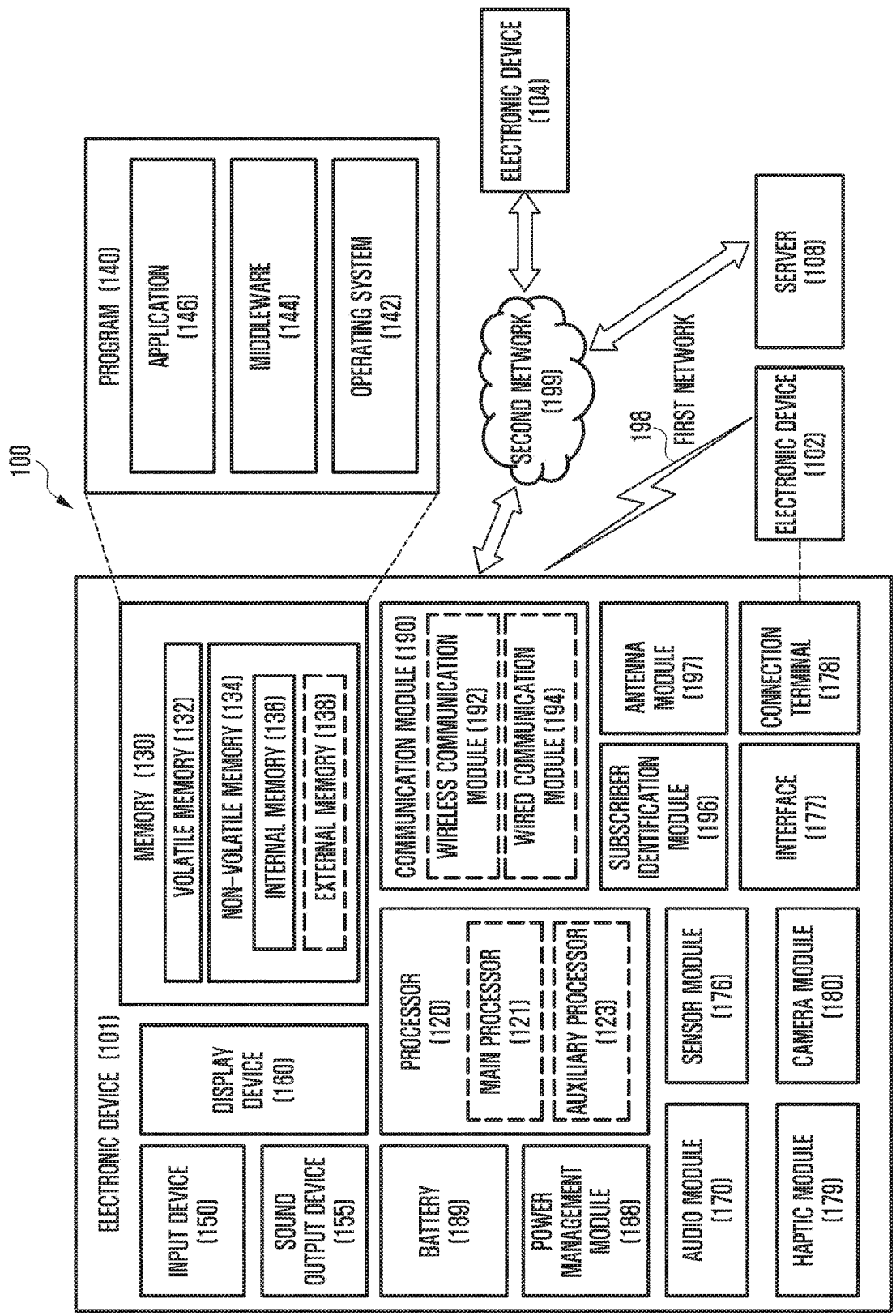
FIG. 1 is a block diagram illustrating an electronic device in a network environment according to an embodiment of the disclosure.

FIG. 1 is a block diagram illustrating an electronic device 101 in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include a single antenna having a radiator formed of a conductor or conductive pattern on a printed circuit board (PCB). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna. According to a certain embodiment, any component (e.g., RFIC) other than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
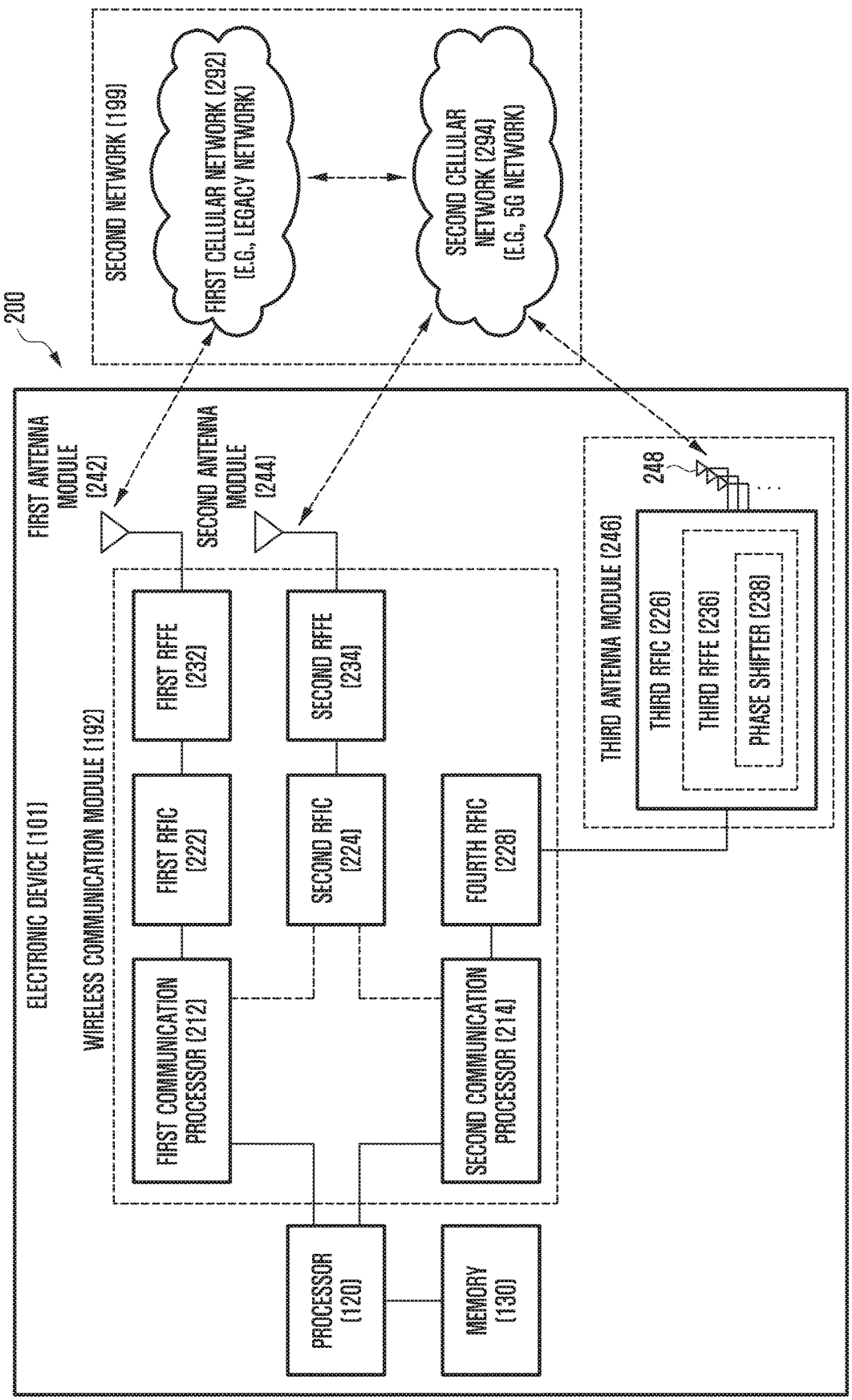
FIG. 2 is a block diagram illustrating an electronic device in a network environment including a plurality of cellular networks according to an embodiment of the disclosure.

FIG. 2 is a block diagram 200 illustrating an electronic device 101 in a network environment including a plurality of cellular networks according to various embodiment of the disclosure.

Referring to FIG. 2, the electronic device 101 may include a first communication processor (CP) 212, a second CP 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A second network 199 may include a first cellular network 292 and a second cellular network 294. According to another embodiment, the electronic device 101 may further include at least one of components shown and described in FIG. 1, and the second network 199 may further include at least one other network. According to an embodiment, the first CP 212, the second CP 214, the first RFIC 222, the second RFIC 224, the fourth RFIC 228, the first RFFE 232, and the second RFFE 234 may form a wireless communication module 192. According to another embodiment, the fourth RFIC 228 may be omitted or included as part of the third RFIC 226.

The first CP 212 may establish a communication channel in a band to be used for wireless communication with the first cellular network 292 and support legacy network communication over the established communication channel According to various embodiments, the first cellular network 292 may be a legacy network such as 2G, 3G, 4G, or long term evolution (LTE) network. The second CP 214 may establish a communication channel corresponding to a designated band (e.g., from about 6 GHz to about 60 GHz) in a band to be used for wireless communication with the second cellular network 294, and support 5G network communication over the established communication channel According to various embodiments, the second cellular network 294 may be a 5G network defined in 3GPP. Additionally, according to an embodiment, the first CP 212 or the second CP 214 may establish a communication channel corresponding to another designated band (e.g., below about 6 GHz) in the band to be used for wireless communication with the second cellular network 294, and support 5G network communication over the established communication channel According to an embodiment, the first CP 212 and the second CP 214 may be implemented in a single chip or a single package. According to various embodiments, the first CP 212 or the second CP 214 may be formed in a single chip or a single package together with the processor 120 (e.g., the auxiliary processor 123) or the communication module 190 as shown in FIG. 1.

The first RFIC 222 may convert, in case of transmission, a baseband signal generated by the first CP 212 into a radio frequency (RF) signal of about 700 MHz to about 3 GHz to be used in the first cellular network 292 (e.g., a legacy network). In case of reception, an RF signal may be obtained from the first cellular network 292 via an antenna (e.g., the first antenna module 242) and preprocessed through an RFFE (e.g., the first RFFE 232). Then, the first RFIC 222 may convert the preprocessed RF signal into a baseband signal to be processed by the first CP 212.

The second RFIC 224 may convert, in case of transmission, a baseband signal generated by the first CP 212 or the second CP 214 into an RF signal (hereinafter, referred to as a 5G Sub6 RF signal) of a Sub6 band (e.g., about 6 GHz or less) to be used in the second cellular network 294 (e.g., the 5G network). In case of reception, a 5G Sub6 RF signal may be obtained from the second cellular network 294 via an antenna (e.g., the second antenna module 244) and preprocessed through an RFFE (e.g., the second RFFE 234). Then, the second RFIC 224 may convert the preprocessed 5G Sub6 RF signal into a baseband signal to be processed by a corresponding one of the first CP 212 and the second CP 214.

The third RFIC 226 may convert, in case of transmission, a baseband signal generated by the second CP 214 into an RF signal (hereinafter, referred to as a 5G Above6 RF signal) of a 5G Above6 band (e.g., from about 6 GHz to about 60 GHz) to be used in the second cellular network 294 (e.g., the 5G network). In case of reception, a 5G Above6 RF signal may be obtained from the second cellular network 294 via an antenna (e.g., the antenna 248) and preprocessed through the third RFFE 236. Then, the third RFIC 226 may convert the preprocessed 5G Above6 RF signal into a baseband signal to be processed by the second CP 214. According to an embodiment, the third RFFE 236 may be formed as part of the third RFIC 226.

According to an embodiment, the electronic device 101 may include the fourth RFIC 228 either separately from or as part of the third RFIC 226. The fourth RFIC 228 may convert, in case of transmission, a baseband signal generated by the second CP 214 to an RF signal (hereinafter, referred to as an IF signal) of an intermediate frequency (IF) band (e.g., from about 9 GHz to about 11 GHz) and then transmit the IF signal to the third RFIC 226. The third RFIC 226 may convert the IF signal into a 5G Above6 RF signal. In case of reception, a 5G Above6 RF signal may be received from the second cellular network 294 (e.g., the 5G network) via an antenna (e.g., the antenna 248) and converted into an IF signal by the third RFIC 226. The fourth RFIC 228 may convert the IF signal into a baseband signal to be processed by the second CP 214.

According to an embodiment, the first RFIC 222 and the second RFIC 224 may be implemented as at least part of a single chip or package. According to an embodiment, the first RFFE 232 and the second RFFE 234 may be implemented as at least part of a single chip or package. According to an embodiment, at least one of the first antenna module 242 and the second antenna module 244 may be omitted or combined with another antenna module to process RF signals of a plurality of bands.

According to an embodiment, the third RFIC 226 and the antenna 248 may be disposed on the same printed circuit board (PCB) to form a third antenna module 246. For example, the wireless communication module 192 or the processor 120 as shown in FIG. 1 may be disposed on a first PCB (or a main PCB). In this case, the third RFIC 226 may be disposed on a portion (e.g., a lower surface) of a second PCB (or a sub PCB), which is different from the first PCB, and the antenna 248 may be disposed on another portion (e.g., an upper surface) of the second PCB, so that the third antenna module 246 may be formed. Disposing the third RFIC 226 and the antenna 248 on the same PCB may reduce the length of a transmission line therebetween. This is advantageous to reducing the loss (e.g., attenuation) of signals, caused by the transmission line, in a super-high frequency band (e.g., about 6 GHz to about 60 GHz) used for the 5G network communication. Therefore, the electronic device 101 has improvement in quality or speed of communication with the second cellular network 294 (e.g., the 5G network).

According to an embodiment, the antenna 248 may be formed of an antenna array that includes a plurality of antenna elements that may be used for beamforming. In this case, the third RFIC 226 may include a plurality of phase shifters 238, as part of the third RFFE 236, corresponding to the plurality of antenna elements. In case of transmission, the plurality of phase shifters 238 may convert the phases of 5G Above6 RF signals to be transmitted to an external entity (e.g., a base station of the 5G network) outside the electronic device 101 via the corresponding antenna elements. In case of reception, the plurality of phase shifters 238 may convert the phases of 5G Above6 RF signals, respectively received from the external entity through the corresponding antenna elements, to the same or substantially same phase. This enables transmission/reception between the electronic device 101 and the external entity through beamforming The second cellular network 294 (e.g., the 5G network) may be operated independently of (e.g., Stand-Alone (SA)) or in combination with (e.g., Non-Stand Alone (NSA)) the first cellular network 292 (e.g., the legacy network). For example, the 5G network may have only an access network (e.g., a 5G radio access network (RAN) or a next generation RAN (NG RAN)) without a core network (e.g., a next generation core (NGC)). In this case, the electronic device 101 may access the access network of the 5G network and then access an external network (e.g., Internet) under the control of a core network (e.g., an evolved packed core (EPC)) of the legacy network. Protocol information (e.g., LTE protocol information) for communication with the legacy network or protocol information (e.g., new radio (NR) protocol information) for communication with the 5G network is stored in the memory 230 and is accessible to other component (e.g., the processor 120, the first CP 212, or the second CP 214).

Figure 3A:
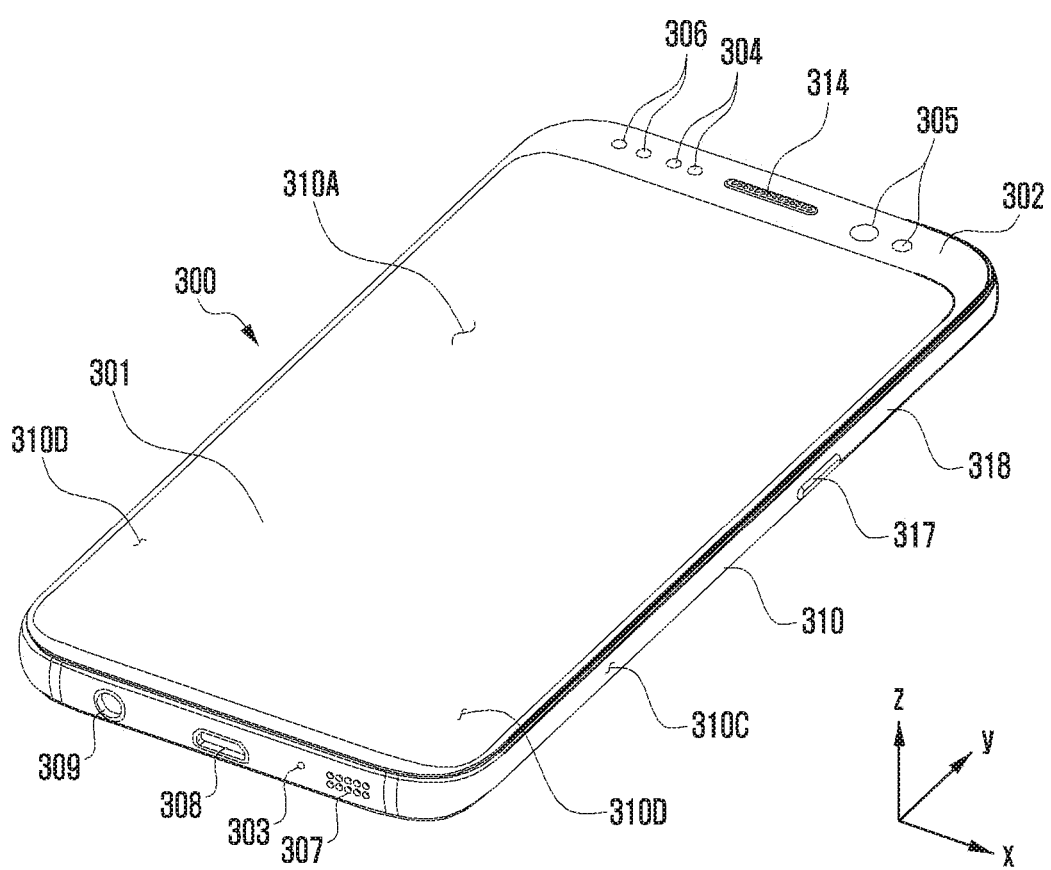
FIG. 3A is a perspective view showing a front surface of a mobile electronic device according to an embodiment of the disclosure.
Figure 3B:
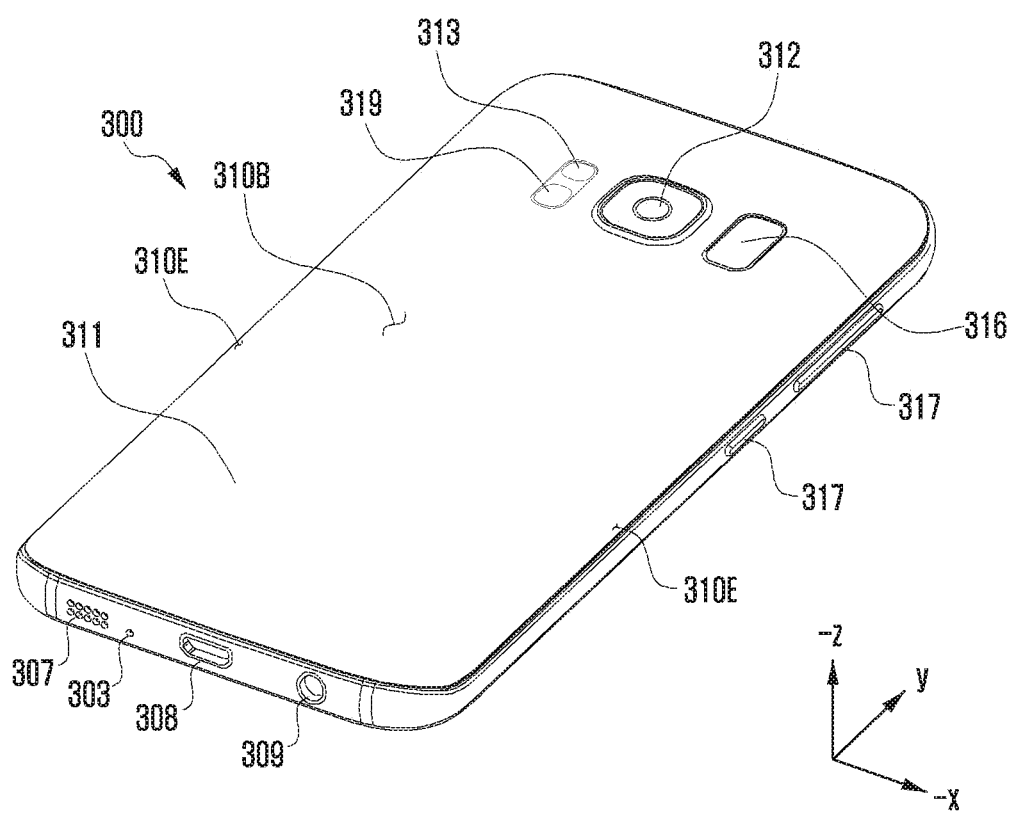
FIG. 3B is a perspective view showing a rear surface of the mobile electronic device shown in FIG. 3A according to an embodiment of the disclosure.

FIG. 3A is a perspective view showing a front surface of a mobile electronic device 300 according to an embodiment of the disclosure, and FIG. 3B is a perspective view showing a rear surface of the mobile electronic device 300 shown in FIG. 3A according to an embodiment of the disclosure.

Referring to FIGS. 3A and 3B, the mobile electronic device 300 according to an embodiment may include a housing 310 that includes a first surface (or front surface) 310A, a second surface (or rear surface) 310B, and a lateral surface 310C that surrounds a space between the first surface 310A and the second surface 310B. In another embodiment (not shown), the housing may refer to a structure that forms a part of the first surface 310A, of the second surface 310B, and of the lateral surface 310C. According to an embodiment, the first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof The lateral surface 310C may be formed of a lateral bezel structure (or "lateral member") 318 which is combined with the front plate 302 and the rear plate 311 and includes a metal and/or polymer. In a certain embodiment, the rear plate 311 and the lateral bezel structure 318 may be integrally formed and may have the same material (e.g., a metallic material such as aluminum).

In the illustrated embodiment, the front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. In a certain embodiment, the front plate 302 (or the rear plate 311) may include only one of the first regions 310D (or of the second regions 310E). In another embodiment, the first regions 310D or the second regions 310E may not be included in part. In such embodiments, when viewed from a lateral side of the electronic device 300, the lateral bezel structure 318 may have a first thickness (or width) on a lateral side where the first or second region 310D or 310E is not included, and may have a second thickness, being smaller than the first thickness, on another lateral side where the first or second region 310D or 310E is included.

According to an embodiment, the electronic device 300 may include at least one of a display 301, audio modules 303, 307 and 314, sensor modules 304, 316 and 319, camera modules 305, 312 and 313, a key input device 317, a light emitting device 306, and connector holes 308 and 309. In a certain embodiment, the electronic device 300 may omit at least one (e.g., the key input device 317 or the light emitting device 306) of the above components, or may further include any other component.

The display 301 may be exposed through a substantial portion of the front plate 302, for example. In a certain embodiment, at least a part of the display 301 may be exposed through the front plate 302 that forms the first surface 310A and the first region 310D of the lateral surface 310C. In a certain embodiment, outlines (i.e., edges and corners) of the display 301 may have the substantially same form as those of the front plate 302. In another embodiment (not shown), the spacing between the outline of the display 301 and the outline of the front plate 302 may be substantially unchanged in order to enlarge the exposed area of the display 301.

In another embodiment (not shown), a recess or opening may be formed in a portion of a display area of the display 301 to accommodate at least one of the audio module 314, the sensor module 304, the camera module 305, and the light emitting device 306. In another embodiment (not shown), at least one of the audio module 314, the sensor module 304, the camera module 305, the fingerprint sensor 316, and the light emitting element 306 may be disposed on the back of the display area of the display 301. In yet another embodiment (not shown), the display 301 may be combined with or adjacent to a touch sensing circuit, a pressure sensor capable of measuring the touch strength (pressure), and/or a digitizer for detecting a stylus pen. In some embodiments, at least a part of the sensor modules 304 and 319 and/or at least a part of the key input device 317 may be disposed in the first region 310D and/or the second region 310E.

The audio modules 303, 307 and 314 may correspond to a microphone hole 303 and speaker holes 307 and 314, respectively. The microphone hole 303 may contain a microphone disposed therein for acquiring external sounds and, in any case, contain a plurality of microphones to sense a sound direction. The speaker holes 307 and 314 may be classified into an external speaker hole 307 and a call receiver hole 314. In some embodiments, such holes 303, 307 and 314 may be implemented as a single hole, or a speaker (e.g., a piezo speaker) may be provided without the speaker holes 307 and 314.

The sensor modules 304, 316 and 319 may generate electrical signals or datacorresponding to an internal operating state of the electronic device 300 or to an external environmental condition. The sensor modules 304, 316 and 319 may include a first sensor module 304 (e.g., a proximity sensor) and/or a second sensor module (not shown, e.g., a fingerprint sensor) disposed on the first surface 310A of the housing 310, and/or a third sensor module 319 (e.g., an HRM sensor) and/or a fourth sensor module 316 (e.g., a fingerprint sensor) disposed on the second surface 310B of the housing 310. The fingerprint sensor may be disposed on the second surface 310B as well as the first surface 310A (e.g., the display 301) of the housing 310. Although not shown, the electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera device 312 and/or a flash 313 disposed on the second surface 310B. The camera module 305 or 312 may include one or more lenses, an image sensor, and/or an image signal processor. The flash 313 may include, for example, a light emitting diode or a xenon lamp. In some embodiments, two or more lenses (infrared cameras, wide angle and telephoto lenses) and image sensors may be disposed on one side of the electronic device 300.

The key input device 317 may be disposed on the lateral surface 310C of the housing 310. In another embodiment, the electronic device 300 may not include some or all of the above-mentioned key input devices 317, and the key input device 317 which is not included may be implemented in any other form such as a soft key on the display 301. In a certain embodiment, the key input device may include the sensor module 316 disposed on the second surface 310B of the housing 310.

The light emitting device 306 may be disposed on the first surface 310A of the housing 310. For example, the light emitting device 306 may provide status information of the electronic device 300 in optical form. In another embodiment, the light emitting device 306 may provide a light source associated with the operation of the camera module 305. The light emitting device 306 may include, for example, an LED, an IR LED, or a xenon lamp.

The connector holes 308 and 309 may include a first connector hole 308 adapted for a connector (e.g., a USB connector) of transmitting and receiving power and/or data to and from an external electronic device, and/or a second connector hole 309 adapted for a connector (e.g., an earphone jack) of transmitting and receiving an audio signal to and from an external electronic device.

Figure 3C:
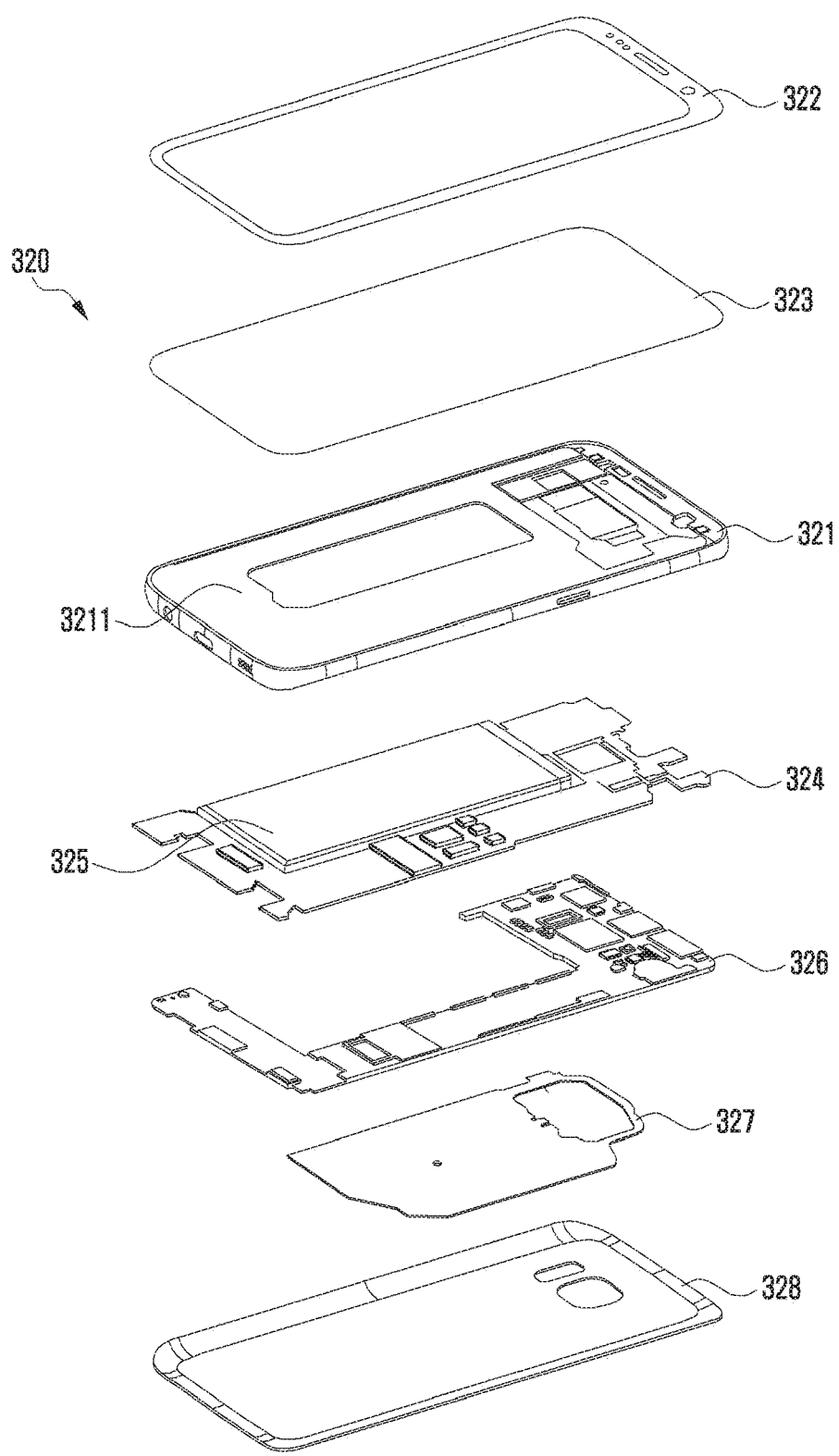
FIG. 3C is an exploded perspective view showing a mobile electronic device according to an embodiment of the disclosure.

FIG. 3C is an exploded perspective view showing a mobile electronic device 320 according to an embodiment of the disclosure.

Referring to FIG. 3C, the mobile electronic device 320 (e.g., the mobile electronic device 300 in FIGS. 3A and 3B) may include a lateral bezel structure 321, a first support member 3211 (e.g., a bracket), a front plate 322, a display 323, a printed circuit board (PCB) 324, a battery 325, a second support member 326 (e.g., a rear case), an antenna 327, and a rear plate 328. In some embodiments, the electronic device 320 may not include at least one (e.g., the first support member 3211 or the second support member 326) of the above components or may further include any other component. Some components of the electronic device 320 may be the same as or similar to those of the electronic device 300 shown in FIG. 3A or 3B, so that repeated descriptions are omitted below.

The first support member 3211 is disposed inside the electronic device 320 and may be connected to or integrated with the lateral bezel structure 321. The first support member 3211 may be formed of, for example, a metal material and/or a non-metal (e.g., polymer) material. The first support member 3211 may be combined with the display 323 at one side thereof and also combined with the PCB 324 at the other side thereof. On the PCB 324, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, volatile memory or non-volatile memory.

The interface may include, for example, a high definition multimedia interface (HDMI), a universal serial bus (USB) interface, an SD card interface, and/or an audio interface. The interface may electrically or physically connect the electronic device 300 with an external electronic device and may include a USB connector, an SD card/MMC connector, or an audio connector.

The battery 325 is a device for supplying power to at least one component of the electronic device 320, and may include, for example, a non-rechargeable primary battery, a rechargeable secondary battery, or a fuel cell. At least a part of the battery 325 may be disposed on the substantially same plane as the PCB 324. The battery 325 may be integrally disposed within the electronic device 320, and may be detachably disposed from the electronic device 320.

The antenna 327 may be disposed between the rear plate 328 and the battery 325. The antenna 327 may include, for example, a near field communication (NFC) antenna, a wireless charging antenna, and/or a magnetic secure transmission (MST) antenna. The antenna 327 may perform short-range communication with an external device, or transmit and receive power required for charging wirelessly. In another embodiment, an antenna structure may be formed by a part or combination of the lateral bezel structure 321 and/or the first support member 3211.

Figure 4A:
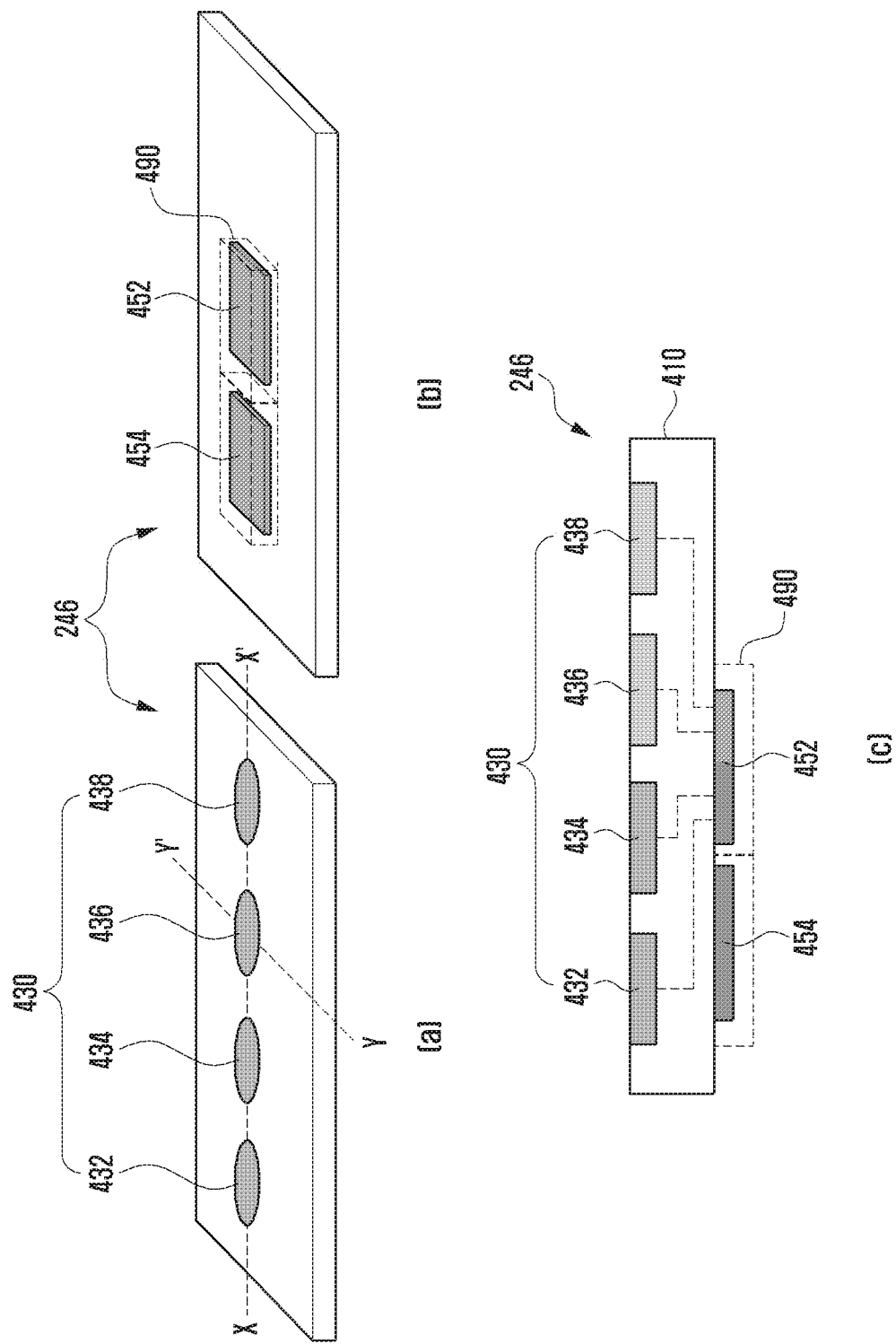
FIG. 4A shows an embodiment of a structure of the third antenna module shown in and described with reference to FIG. 2 according to an embodiment of the disclosure.

FIG. 4A shows an embodiment of a structure of the third antenna module 246 shown in and described with reference to FIG. 2 according to an embodiment of the disclosure. Specifically, in FIG. 4A, part (a) is a perspective view showing an upper surface of the third antenna module 246, and part (b) is a perspective view showing a lower surface of the third antenna module 246. In addition, part (c) is a cross-sectional view taken along the line X-X'.

Referring to FIG. 4A, in an embodiment, the third antenna module 246 may include a printed circuit board (PCB) 410, an antenna array 430, a radio frequency integrated circuit (RFIC) 452, and a power management integrated circuit (PMIC) 454. Optionally, the third antenna module 246 may further include a shielding member 490. In other embodiments, at least one of the above-mentioned components may be omitted, or at least two of the above components may be integrally formed.

The PCB 410 may include a plurality of conductive layers and a plurality of non-conductive layers stacked alternately with the conductive layers. Using wirings formed in the conductive layers and conductive routes formed in the non-conductive layers, the PCB 410 may provide electrical connections among various electronic components disposed therein/thereon.

The antenna array 430 (e.g., 248 in FIG. 2) may include a plurality of antenna elements 432, 434, 436, and 438 arranged to form a directional beam. The antenna elements 432, 434, 436, and 438 may be formed on a first surface of the PCB 410 as shown. According to another embodiment, the antenna array 430 may be formed inside the PCB 410. According to embodiments, the antenna array 430 may include a plurality of antenna arrays having the same shape/type or different shapes/types (e.g., a dipole antenna array and/or a patch antenna array).

The RFIC 452 (e.g., 226 in FIG. 2) may be disposed on a second surface, opposite to the first surface, of the PCB 410 to be spaced apart from the antenna array 430. The RFIC 452 is configured to process a signal of a selected frequency band transmitted/received through the antenna array 430. According to an embodiment, in case of transmission, the RFIC 452 may convert a baseband signal obtained from a communication processor (not shown) into an RF signal of a specified band. Also, in case of reception, the RFIC 452 may convert an RF signal received through the antenna array 430 into a baseband signal and then deliver the baseband signal to the communication processor.

According to another embodiment, in case of transmission, the RFIC 452 may up-convert an IF signal (e.g., about 9 GHz to about 11 GHz), obtained from an intermediate frequency integrated circuit (IFIC) (e.g., 228 in FIG. 2), to an RF signal of a selected band. Also, in case of reception, the RFIC 452 may down-convert an RF signal obtained through the antenna array 430, convert the down-converted signal into an IF signal, and then deliver the IF signal to the IFIC.

The PMIC 454 may be disposed on the second surface of the PCB 410 to be spaced apart from the antenna array 430. The PMIC 454 may receive an electric current from a main PCB (not shown) and provide the necessary power to various components (e.g., the RFIC 452) on the antenna module.

The shielding member 490 may be disposed on the second surface of the PCB 410 to electromagnetically shield at least one of the RFIC 452 and the PMIC 454. According to an embodiment, the shielding member 490 may be formed of a shield can.

Although not shown, in various embodiments, the third antenna module 246 may be electrically coupled to another PCB (e.g., a main PCB) via a module interface. The module interface may include a connecting member such as a coaxial cable connector, a board-to-board connector, an interposer, or a flexible PCB (FPCB). The RFIC 452 and/or the PMIC 454 of the antenna module may be electrically connected to the PCB through the connecting member.

FIG. 4B is a cross-sectional view taken along the line Y-Y' in FIG. 4A. As shown, the PCB 410 may include an antenna layer 411 and a network layer 413.

Referring to FIG. 4B, the antenna layer 411 may include at least one dielectric layer 437-1. Also, the antenna layer 411 may include an antenna element 436 and/or a power feeder 425, which are formed on or in the dielectric layer 437-1. The power feeder 425 may include a feed point 427 and/or a feed (signal) line 429.

The network layer 413 may include at least one dielectric layer 437-2. Also, the network layer 413 may include at least one ground layer 433, at least one conductive via 435, a transmission line 423, and/or a signal line 429, which are formed on or in the dielectric layer 437-2.

In addition, the RFIC 452 (e.g., the third RFIC 226 in FIG. 2) may be electrically connected to the network layer 413 through, for example, first and second connection members (e.g., solder bumps) 440-1 and 440-2. In other embodiments, various connection members or structures such as soldering or ball grid array (BGA) may be used instead of the above connection members. The RFIC 452 may be electrically connected to the antenna element 436 through the first connection member 440-1, the transmission line 423, and the power feeder 425. Also, the RFIC 452 may be electrically connected to the ground layer 433 via the second connection member 440-2 and the conductive via 435. Although not shown, the RFIC 452 may also be electrically coupled to the above-mentioned module interface through the signal line 429.

Figure 5:
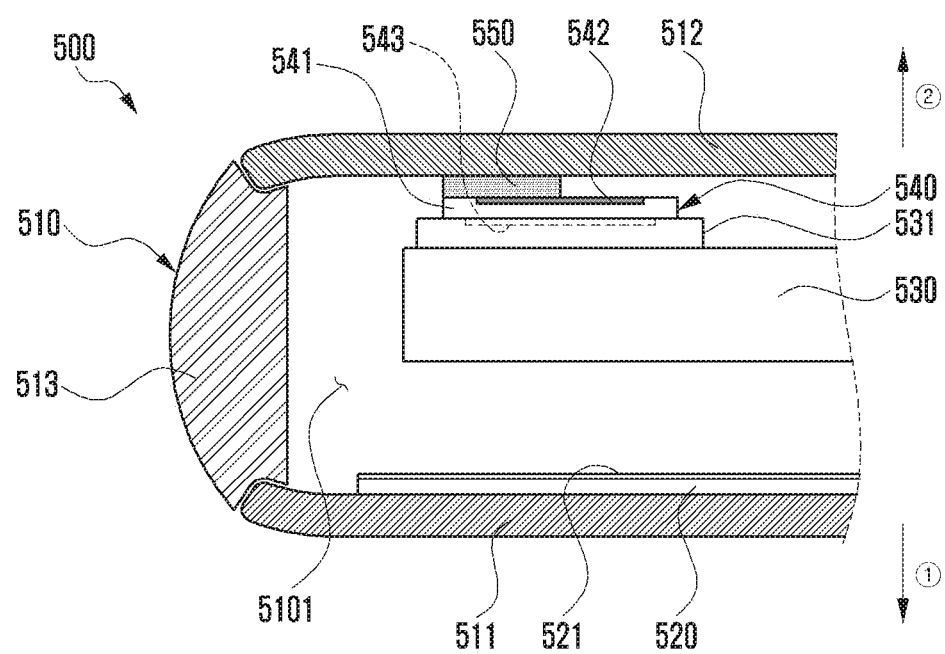
FIG. 5 is a cross-sectional view partially showing an electronic device according to an embodiment of the disclosure.

FIG. 5 is a cross-sectional view partially showing an electronic device 500 according to an embodiment of the disclosure.

The electronic device 500 of FIG. 5 may be similar, at least in part, to the electronic device 300 of FIG. 3A, or may include other embodiments of the electronic device.

Referring to FIG. 5, the electronic device 500 may include a housing 510 that includes a first plate 511 facing in a first direction (e.g., the z direction in FIG. 3A), a second plate 512 facing in a second direction (e.g., the −z direction in FIG. 3A) opposite to the first direction, and a lateral member 513 surrounding an inner space 5101 between the first plate 511 and the second plate 512. According to an embodiment, the second plate 512 may be formed of, for example, coated or colored glass, ceramic, polymer, metal, or any combination thereof According to an embodiment, the first plate 511 and/or the second plate 512 may include only a flat portion or include a flat portion and a curved portion extending from the flat portion. According to an embodiment, the electronic device 500 may include a display 520 that is disposed in the inner space 5101 and visible to the outside through at least a portion of the first plate 511. According to an embodiment, the display 520 may include a flexible touch screen display. According to an embodiment, the display 520 may include a conductive plate 521 formed for insulation and noise shielding. According to an embodiment, the conductive plate 521 may include a copper (Cu) sheet in the form of an adhesive film According to various embodiments, the electronic device 500 may include an antenna module 540 disposed in the inner space 5101. According to an embodiment, the antenna module 540 may include, as an antenna structure, a substrate 541 and an antenna array 542 having at least one antenna element (e.g., antenna elements 5421, 5422, 5423, and 5424 in FIG. 6A) disposed on the substrate 541. According to an embodiment, the antenna module 540 may further include a wireless communication circuit 543 disposed on the substrate 541 and electrically connected to the antenna array 542. According to an embodiment, the wireless communication circuit 543 may be configured to transmit and/or receive a signal having a frequency of at least a partial band (e.g., a band from 24 GHz to 30 GHz or a band from 37 GHz to 40 GHz) in a band from about 3 GHz to about 100 GHz through the antenna array 542.

According to various embodiments, the antenna module 540 may be disposed on a device substrate 530 (e.g., the PCB 324 in FIG. 3C) through a support member 531 in the inner space 5101 of the electronic device 500. According to an embodiment, the support member 531 may include an interposer for electrically connecting the antenna module 540 to the device substrate 530. In another embodiment, the antenna module 540 may be mounted directly on the device substrate 530. In another embodiment, the antenna module 540 may be fixedly disposed on a certain structure in the inner space 5101 of the electronic device 500 and electrically connected to the device substrate 530 through a conductive cable (e.g., a flexible printed circuit board (FPCB)).

According to various embodiments, the electronic device 500 may include a dielectric 550 disposed between the antenna module 540 and the second plate 512 at a position overlapped with the antenna module 540 when the second plate 512 is viewed from above. According to an embodiment, the dielectric 550 may prevent the radiation performance of a beam pattern formed by the antenna array 542 from being degraded. According to an embodiment, the dielectric 550 may be disposed to be overlapped with at least a portion of the antenna module 540 when the second plate 512 is viewed from above. According to an embodiment, the dielectric 550 may prevent degradation of radiation performance due to the second plate 512 by at least partially passing a radio signal transmitted to and/or received from the antenna module 540.

Figure 6A:
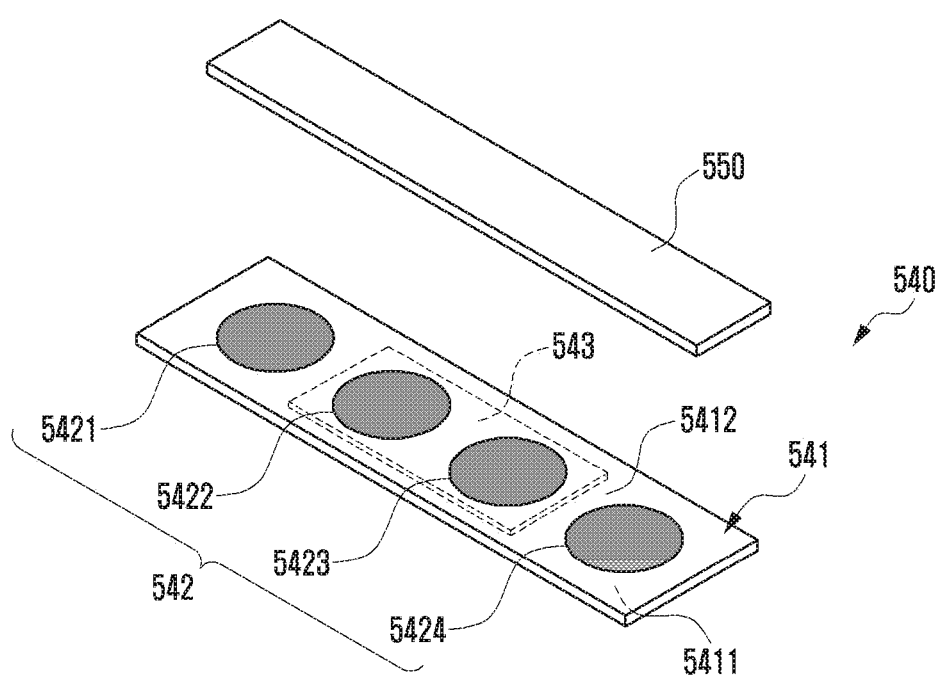
FIG. 6A is a perspective view showing an antenna module according to an embodiment of the disclosure.

FIG. 6A is a perspective view showing an antenna module 540 according to embodiment of the disclosure.

The antenna module 540 of FIG. 6A may be similar, at least in part, to the third antenna module 246 of FIG. 2, or may include other embodiments of the antenna module.

Referring to FIG. 6A, the antenna module 540 may include the substrate 541 that includes a first surface 5411 facing a first plate (e.g., the first plate 511 in FIG. 5) and a second surface 5412 opposite to the first surface 5411 and facing a second plate (e.g., the second plate 512 in FIG. 5). According to an embodiment, the antenna module 540 may further include the wireless communication circuit 543 disposed on the first surface 5411 of the substrate 541. According to an embodiment, the antenna module 540 may also include the antenna array 542 that includes antenna elements 5221, 5422, 5423, and 5424 which are disposed at regular intervals on the second surface 5212 of the substrate 541 or to be exposed to the second surface 5212 in the substrate 541. The antenna elements 5221, 5422, 5423, and 5424 are electrically connected to the wireless communication circuit 543. According to an embodiment, in the antenna module 540, the antenna elements 5221, 5422, 5423, and 5424 of the antenna array 542 may have a 1×4 arrangement as shown. In other embodiments, the antenna array 542 may include a single antenna element, two antenna elements having a 1×2 arrangement, three antenna elements having a 1×3 arrangement, or N antenna elements having a 1×N arrangement (N is five or more). Alternatively, the antenna array 542 may include antenna elements having a multi-row multi-column arrangement. According to an embodiment, as shown, the antenna array 542 may include a first antenna element 5241, a second antenna element 5542, a third antenna element 5253, and a fourth antenna element 5424, which are sequentially arranged. According to an embodiment, the antenna elements 5241, 5422, 5423, and 5424 may include a conductive patch disposed on the second surface 5212 of the substrate 541. According to an embodiment, the wireless communication circuit 543 may form a beam pattern in a predetermined direction (e.g., the second direction) through the antenna elements 5241, 5422, 5423, and 5424.

According to various embodiments, the dielectric 550 may be disposed at a position overlapped, at least in part, with the antenna module 540 when the second plate (e.g., the second plate 512 in FIG. 5) is viewed from above. According to embodiments, the dielectric 550 may be formed as a separate member disposed in the inner space of the electronic device (e.g., the electronic device 500 in FIG. 5) or formed of a certain part extended or modified from an existing structure (e.g., injection-molded member such as a lateral support structure or a bracket) disposed in the inner space of the electronic device (e.g., the electronic device 500 in FIG. 5). According to an embodiment, the dielectric 550 may be appropriately determined in consideration of the appearance (e.g., shape) or material properties (e.g., material properties of the second plate) of the electronic device.

Figure 6B:
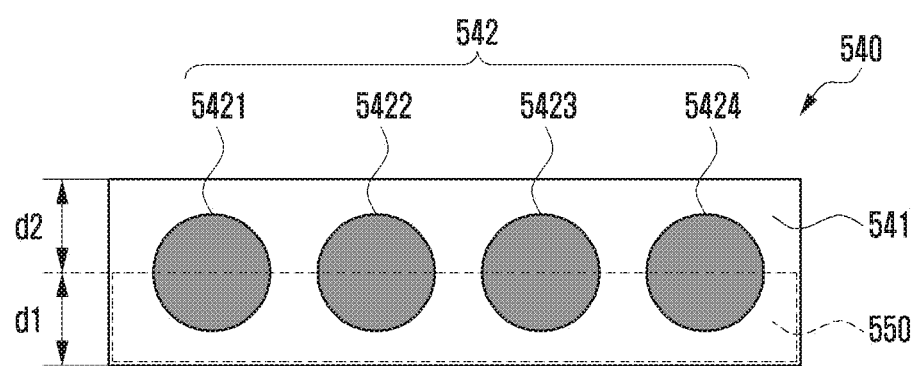
FIG. 6B is a plan view showing an arrangement relationship between an antenna module and a dielectric according to an embodiment of the disclosure.

FIG. 6B is a plan view showing an arrangement relationship between an antenna module 540 and a dielectric 550 according to embodiment of the disclosure.

Referring to FIG. 6B, the antenna module 540 may include the substrate 541 having a rectangular shape. According to an embodiment, the antenna module 540 may be disposed at a position at least partially overlapped with the dielectric 550 when the second plate (e.g., the second plate 512 in FIG. 5) is viewed from above. According to an embodiment, the dielectric 550 may be overlapped with the substrate 541 along the length direction of the substrate 541 so as not to exceed a half portion of the substrate 541. According to an embodiment, in the dielectric 550, the ratio of an overlapped area to a non-overlapped area may be determined in the range of about 1:1 to 1:5 when the second plate is viewed from above. For example, in the dielectric 550 disposed along the length direction of the substrate 541 as shown, the ratio of an overlapped area (d1) to a non-overlapped area (d2) may be determined to be 1:1. In another embodiment, the dielectric 550 may be disposed along the length direction of the substrate 541 so as to be overlapped with a half area of the antenna elements 5241, 5422, 5423, and 5424 at maximum.

Figure 7:
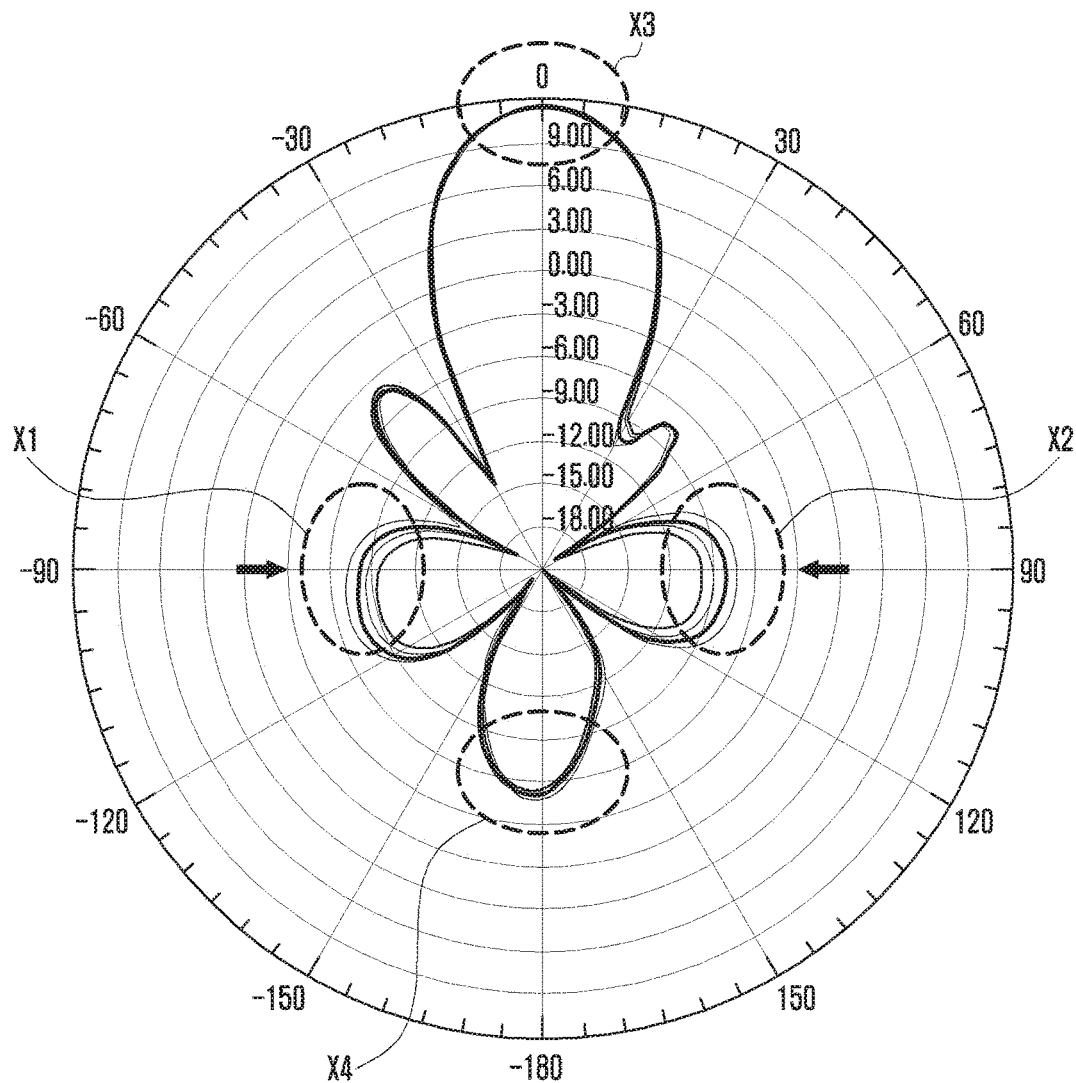
FIG. 7 is a diagram illustrating a radiation pattern of an antenna module according to an embodiment of the disclosure.

FIG. 7 is a diagram illustrating a radiation pattern of an antenna module 540 according to an embodiment of the disclosure.

Viewing the second plate (e.g., the second plate 512 in FIG. 5) from above, the greater the overlapped area of the dielectric (e.g., the dielectric 550 in FIG. 5) without exceeding the half of the substrate (e.g., the substrate 541 in FIG. 5), the more the level of side lobes (e.g., X1 and X2) is improved by 3 dB at maximum. In addition, it can be seen that the radiation performance of a main lobe (e.g., X3) is not degraded and an increase (e.g., about 1 dB) in a back lobe (e.g., X4) is not large.

Figure 8A:
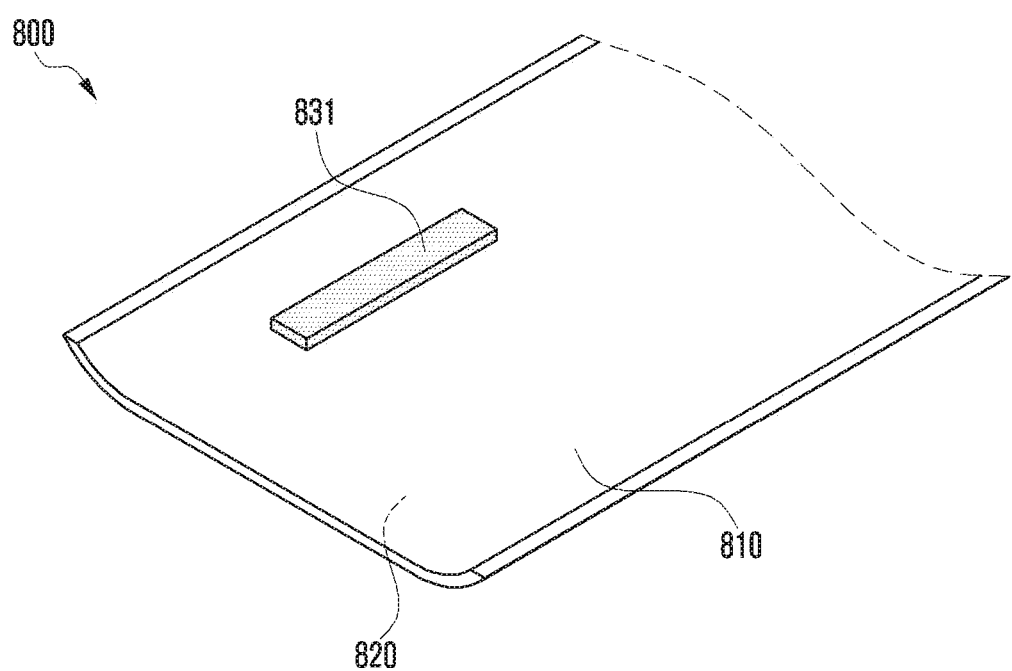
FIGS. 8A and 8B are perspective views showing a dielectric disposed on a second plate according to various embodiment of the disclosure.
Figure 8B:
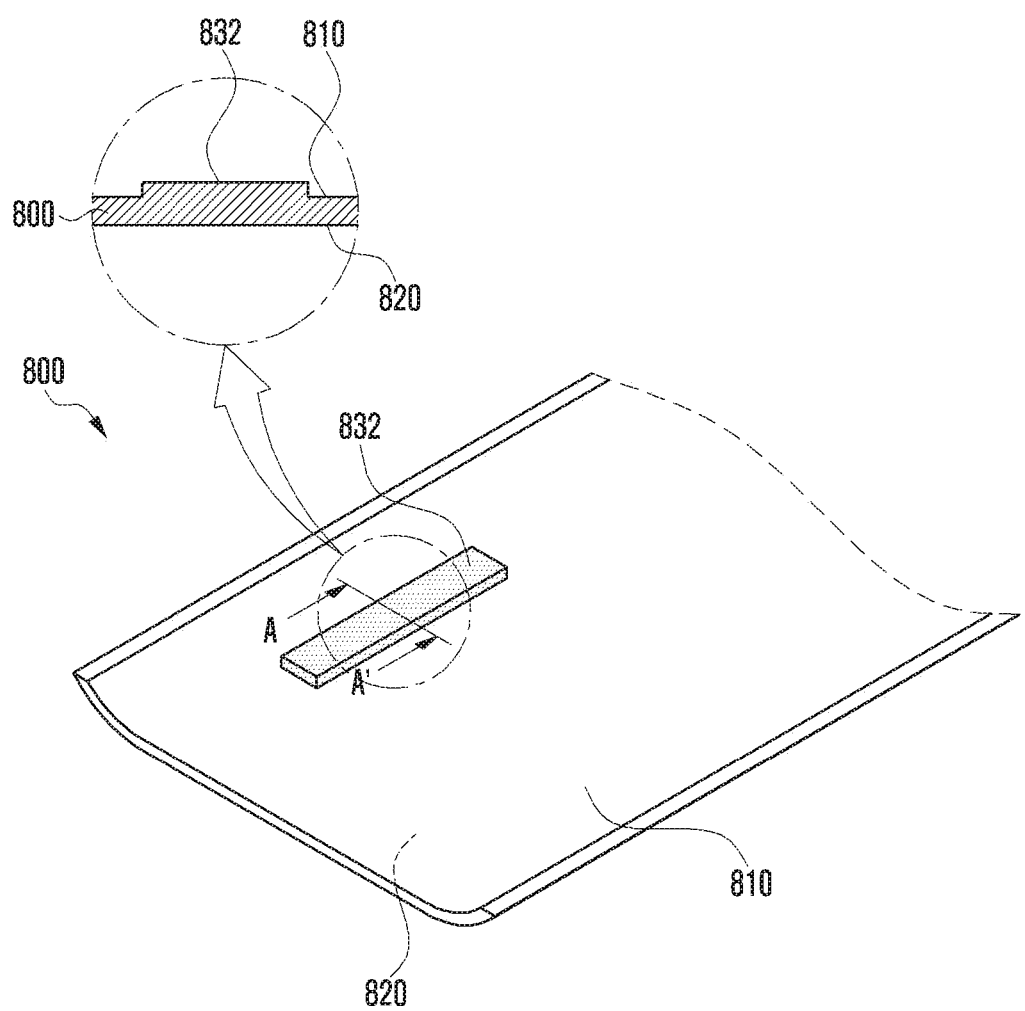

FIGS. 8A and 8B are perspective views showing a dielectric 831 or 832 disposed on a second plate 800 according to various embodiments of the disclosure.

The second plate 800 of FIGS. 8A and 8B may be similar, at least in part, to the rear plate 311 of FIG. 3B or the second plate 512 of FIG. 5, or may include other embodiments of the second plate.

Referring to FIG. 8A, the second plate 800 may include an inner surface 810 facing an inner space (e.g., the inner space 5101 in IG. 5) of an electronic device (e.g., the electronic device 500 in FIG. 5) and an outer surface 820 opposite to the inner surface 810 and facing the outside of the electronic device. According to an embodiment, the dielectric 831 may include a polymeric material (e.g., polycarbonate (PC), urethane, or rubber) attached to the inner surface 810 of the second plate 800. According to an embodiment, the dielectric 831 may be formed of foam or foam rubber having elasticity. In this case, when the electronic device (e.g., the electronic device 500 in FIG. 5) is assembled, the dielectric 831 is in contact with the top of an antenna module (e.g., the antenna module 540 in FIG. 5) and thereby offers cushion to the antenna module.

Referring to FIG. 8B, the dielectric 832 may be integrally formed with the inner surface 810 of the second plate 800. For example, when the second plate 800 is formed of an injection-molded member, a certain portion of the inner surface 810 of the second plate 800 may protrude to have a greater thickness than that of a peripheral portion and thereby serve as the dielectric. In this case, the dielectric 832 is not separately fabricated to improve the radiation performance of the antenna module (e.g., the antenna module 540 in FIG. 5), so that no additional fabricating process is required.

According to an embodiment, the dielectric may be attached to the inner surface of the second plate (e.g., the second plate 512 in FIG. 5) in the inner space (e.g., the inner space 5101 in FIG. 5) of the electronic device (e.g., the electronic device 500 in FIG. 5) and disposed to be spaced apart from the antenna module (e.g., the antenna module 540 in FIG. 5). According to another embodiment, the dielectric may be attached to an upper surface of the antenna module (e.g., the antenna module 540 in FIG. 5) in the inner space (e.g., the inner space 5101 in FIG. 5) of the electronic device (e.g., the electronic device 500 in FIG. 5) and disposed to be spaced apart from the inner surface of the second plate (e.g., the second plate 512 in FIG. 5). According to another embodiment, the dielectric may not be provided separately and instead replaced by a partially extended or modified portion of an injection-molded member (e.g., a support member such as an injection-molded bracket) disposed inside the electronic device.

According to various embodiments of the disclosure, it is possible to prevent the degradation of the radiation performance of the antenna module by only adding a relatively simple dielectric. In addition, the added dielectric can perform functions of supporting and buffering the antenna module, thus improving the reliability of the electronic device.

According to various embodiments, an electronic device (e.g., the electronic device 500 in FIG. 5) may include a housing (e.g., the housing 510 in FIG. 5) including a first plate (e.g., the first plate 511 in FIG. 5) facing a first direction (e.g., the first direction in FIG. 5), a second plate (e.g., the second plate 512 in FIG. 5) facing a second direction (e.g., the second direction in FIG. 5) and opposite to the first plate, and a lateral member (e.g., the lateral member 513 in FIG. 5) surrounding a space (e.g., the inner space 5101 in FIG. 5) between the first plate and the second plate; an antenna structure (e.g., the substrate 541 and the antenna array 542 in FIG. 5) disposed to be substantially parallel to the second plate in the space, and including at least one antenna element (e.g., the antenna array 542 in FIG. 5) disposed to face the second plate; a dielectric (e.g., the dielectric 550 in FIG. 5) disposed, in the space, to be overlapped, at least in part, with the antenna structure without exceeding a half area of the antenna structure when the second plate is viewed from above; and a wireless communication circuit (e.g., the wireless communication circuit 543 in FIG. 5) configured to form a directional beam, at least in part, through the at least one antenna element.

According to various embodiments, the wireless communication circuit (e.g., the wireless communication circuit 543 in FIG. 5) may be configured to transmit and/or receive a signal having a frequency between about 3 GHz and about 100 GHz through the at least one antenna element.

According to various embodiments, the dielectric may be disposed to be overlapped with the half area of the antenna structure when the second plate is viewed from above.

According to various embodiments, the antenna structure may include a substrate (e.g., the substrate 541 in FIG. 6A) including a first surface (e.g., the first surface 5411 in FIG. 6A) facing the first direction and a second surface (e.g., the second surface 5412 in FIG. 6A) facing the second direction and opposite to the first surface, and the at least one antenna element may be disposed on the second surface or exposed to the second surface in an inner space between the first and second surfaces.

According to various embodiments, the wireless communication circuit may be disposed on the first surface of the substrate.

According to various embodiments, the at least one antenna element may include a conductive patch disposed on the substrate.

According to various embodiments, the dielectric may be overlapped with a half area of the at least one antenna element when the second plate is viewed from above.

According to various embodiments, the dielectric (e.g., the dielectric 831 in FIG. 8A) may be disposed on an inner surface (e.g., the inner surface 810 in FIG. 8A) of the second plate (e.g., the second plate 800 in FIG. 8A).

According to various embodiments, the dielectric may include a polymeric material attached to an inner surface of the second plate.

According to various embodiments, the dielectric may be disposed to be in contact with both the second plate and the antenna structure.

According to various embodiments, the dielectric may be formed of a part extended or modified from an injection-molded member disposed in the space of the electronic device.

According to various embodiments, the injection-molded member may include a support member or a bracket disposed in the space of the electronic device.

According to various embodiments, the electronic device may further include a display (e.g., the display 520 in FIG. 5) disposed, in the space, to be visible to an outside through at least a portion of the first plate.

According to various embodiments, an electronic device (e.g., the electronic device 500 in FIG. 5) may include a housing (e.g., the housing 510 in FIG. 5) including a first plate (e.g., the first plate 511 in FIG. 5) facing a first direction (e.g., the first direction in FIG. 5), a second plate (e.g., the second plate 512 in FIG. 5) facing a second direction (e.g., the second direction in FIG. 5) and opposite to the first plate, and a lateral member (e.g., the lateral member 513 in FIG. 5) surrounding a space (e.g., the inner space 5101 in FIG. 5) between the first plate and the second plate; an antenna structure (e.g., the substrate 541 and the antenna array 542 in FIG. 5) disposed to be substantially parallel to the second plate in the space, and including a plurality of antenna elements (e.g., the antenna array 542 in FIG. 5) disposed to face the second plate; a dielectric (e.g., the dielectric 550 in FIG. 5) disposed through the second plate to be overlapped, at least in part, with the plurality of antenna elements without exceeding a half area of the plurality of antenna elements when the second plate is viewed from above; and a wireless communication circuit (e.g., the wireless communication circuit 543 in FIG. 5) configured to form a directional beam, at least in part, through the plurality of antenna elements.

According to various embodiments, the wireless communication circuit may be configured to transmit and/or receive a signal having a frequency between about 3 GHz and about 100 GHz through the plurality of antenna elements.

According to various embodiments, the dielectric may be disposed to be overlapped with the half area of the plurality of antenna elements when the second plate is viewed from above.

According to various embodiments, the dielectric (e.g., the dielectric 831 in FIG. 8A or the dielectric 832 in FIG.

8B) may be attached to an inner surface of the second plate (e.g., the second plate 800 in FIG. 8A) or formed integrally with the second plate.

According to various embodiments, the dielectric (e.g., the dielectric 832 in FIG. 8B) may be formed as a protruding portion of the second plate when the second plate is formed.

According to various embodiments, the dielectric may be disposed to be in contact with both the second plate and the antenna structure.

According to various embodiments, the electronic device may further include a display (e.g., the display 520 in FIG. 5) disposed, in the space, to be visible to an outside through at least a portion of the first plate.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a housing including:
        a first plate facing a first direction,
        a second plate facing a second direction and opposite to the first plate, and
        a lateral member surrounding a space between the first plate and the second plate;
    an antenna structure disposed to be parallel to the second plate in the space, and including at least one antenna element disposed to face the second plate;
    a dielectric disposed in the space to overlap, at least in part, with the antenna structure without exceeding a half area of the antenna structure when the second plate is viewed from above; and
    a wireless communication circuit configured to form a directional beam, at least in part, through the at least one antenna element.

2. The electronic device of claim 1, wherein the wireless communication circuit is configured to transmit and/or receive a signal having a frequency between about 3 GHz and about 100 GHz through the at least one antenna element.

3. The electronic device of claim 1, wherein the dielectric is disposed to overlap with the half area of the antenna structure when the second plate is viewed from above.

4. The electronic device of claim 3,
    wherein the antenna structure includes a substrate including:
        a first surface facing the first direction, and
        a second surface facing the second direction and opposite to the first surface, and
    wherein the at least one antenna element is disposed on the second surface or exposed to the second surface in an inner space between the first and second surfaces.

5. The electronic device of claim 4, wherein the wireless communication circuit is disposed on the first surface of the substrate.

6. The electronic device of claim 4, wherein the at least one antenna element includes a conductive patch disposed on the substrate.

7. The electronic device of claim 4, wherein the dielectric is overlapped with a half area of the at least one antenna element when the second plate is viewed from above.

8. The electronic device of claim 1, wherein the dielectric is disposed on an inner surface of the second plate.

9. The electronic device of claim 1, wherein the dielectric includes a polymeric material attached to an inner surface of the second plate.

10. The electronic device of claim 1, wherein the dielectric is disposed to be in contact with both the second plate and the antenna structure.

11. The electronic device of claim 1, wherein the dielectric is formed of a part extended or modified from an injection-molded member disposed in the space of the electronic device.

12. The electronic device of claim 11, wherein the injection-molded member includes a support member or a bracket disposed in the space of the electronic device.

13. The electronic device of claim 1, further comprising:
    a display disposed in the space to be visible to the exterior of the electronic device through at least a portion of the first plate.

14. An electronic device comprising:
    a housing including:
        a first plate facing a first direction,
        a second plate facing a second direction and opposite to the first plate, and
        a lateral member surrounding a space between the first plate and the second plate;
    an antenna structure disposed to be parallel to the second plate in the space, and including a plurality of antenna elements disposed to face the second plate;
    a dielectric disposed through the second plate to overlap, at least in part, with the plurality of antenna elements without exceeding a half area of the plurality of antenna elements when the second plate is viewed from above; and
    a wireless communication circuit configured to form a directional beam, at least in part, through the plurality of antenna elements.

15. The electronic device of claim 14, wherein the wireless communication circuit is configured to transmit and/or receive a signal having a frequency between about 3 GHz and about 100 GHz through the plurality of antenna elements.

16. The electronic device of claim 14, wherein the dielectric is disposed to overlap with the half area of the plurality of antenna elements when the second plate is viewed from above.

17. The electronic device of claim 14, wherein the dielectric is attached to an inner surface of the second plate or formed integrally with the second plate.

18. The electronic device of claim 17, wherein the dielectric is formed as a protruding portion of the second plate when the second plate is formed.

19. The electronic device of claim 14, wherein the dielectric is disposed to be in contact with both the second plate and the antenna structure.

20. The electronic device of claim 14, further comprising:
    a display disposed in the space to be visible to the exterior of the electronic device through at least a portion of the first plate.

* * * * *